United States Patent [19]
McGuirk, Jr.

[11] 3,869,620
[45] Mar. 4, 1975

[54] POWER CONTROL CIRCUIT FOR AUTOMOTIVE VEHICLES AND THE LIKE

[75] Inventor: Francis A. McGuirk, Jr., Chatham, N.J.

[73] Assignee: Wagner Electric Corporation, Parsippany, N.J.

[22] Filed: Sept. 10, 1973

[21] Appl. No.: 395,739

Related U.S. Application Data

[62] Division of Ser. No. 289,283, Sept. 15, 1972, Pat. No. 3,824,403.

[52] U.S. Cl. .................................................. 307/141
[51] Int. Cl. ............................................. H01h 7/00
[58] Field of Search ............ 307/10 AT, 141, 141.4, 307/141.8, 10

[56] References Cited
UNITED STATES PATENTS

| | | | |
|---|---|---|---|
| 3,614,458 | 10/1971 | Stein | 307/10 AT |
| 3,723,967 | 3/1973 | Atkins | 307/10 AT |
| 3,772,900 | 11/1973 | Hopkins | 68/12 R |
| 3,809,915 | 5/1974 | Bost | 307/10 At |

Primary Examiner—Robert K. Schaefer
Assistant Examiner—M. Ginsburg
Attorney, Agent, or Firm—Eyre, Mann & Lucas

[57] ABSTRACT

A power control circuit operative to enable start-up of a vehicle engine in response to a predetermined sequence of events. Upon opening one or more doors by means of a keying circuit actuating a keyable control circuit, a control signal is provided to a timing circuit which in turn provides an enabling signal to an enabling circuit for a predetermined period of time during which engine start-up may be effected by depressing the brake pedal and subsequently actuating the ignition switch. The timer output and the actuation of the brake pedal switch cause energization of a solenoid which normally prevents actuation of the ignition switch. Energization of this solenoid enables actuation of the ignition switch, which in turn mechanically prevents the solenoid from preventing further actuation of the ignition switch after the solenoid is again de-actuated upon either expiration of the enabling signal or de-actuation of the brake light switch.

5 Claims, 1 Drawing Figure

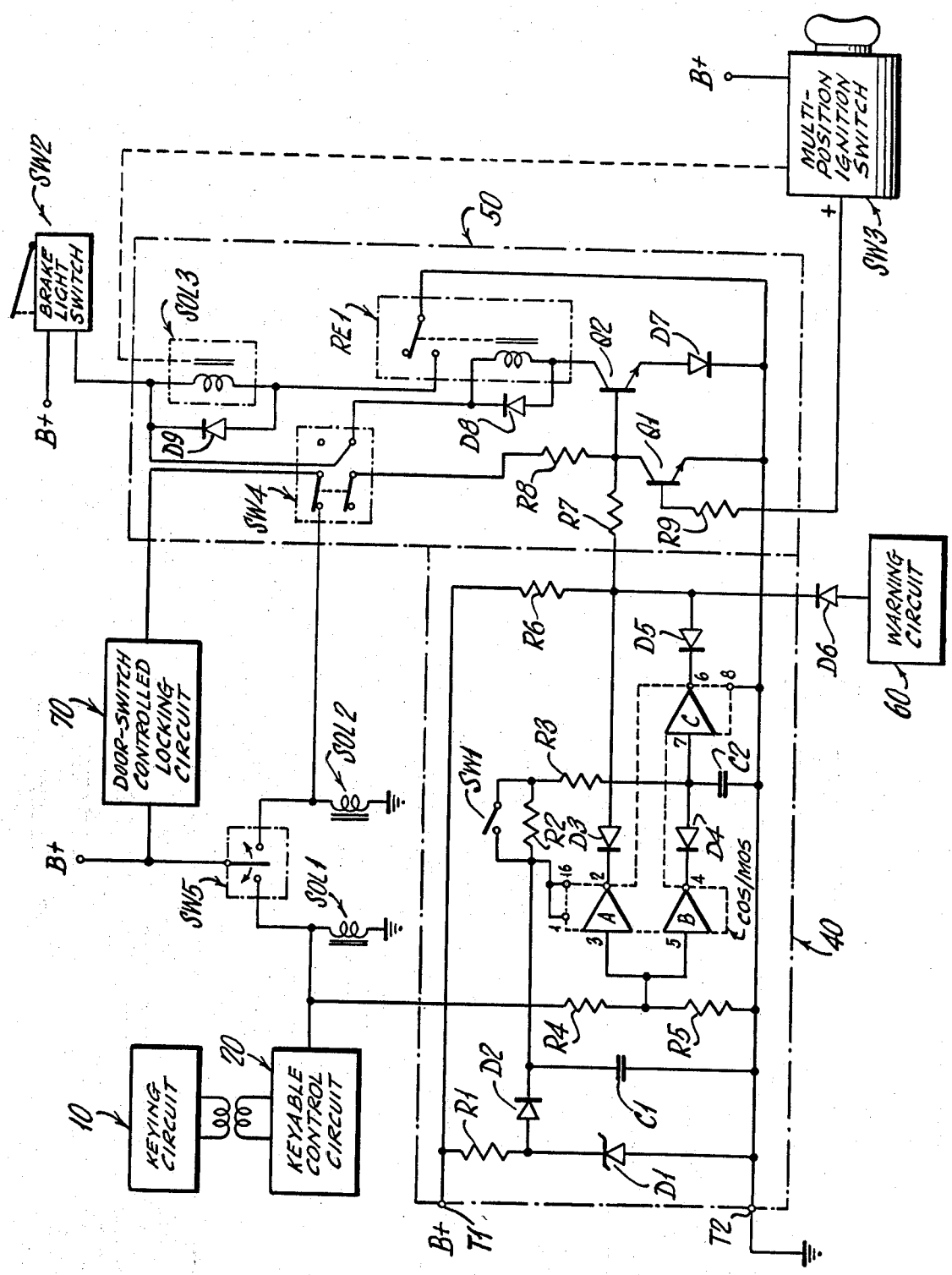

POWER CONTROL CIRCUIT FOR AUTOMOTIVE VEHICLES AND THE LIKE

CROSS REFERENCE TO RELATED APPLICATIONS

This is a division, of application Ser. No. 289,283, filed Sept. 15, 1972, now U.S. Pat. No. 3,824,403 issued on July 16, 1974.

The power control circuit disclosed herein may be employed in the system disclosed in U.S. Pat. No. 3,723,967 issued on Mar. 27, 1973 upon copending application Ser. No. 127,463 entitled INDUCTION-KEYED DOOR LOCK AND POWER CONTROL CIRCUIT FOR AUTOMATIC VEHICLES AND THE LIKE filed on Mar. 24, 1971 in the names of Carl E. Atkins and Paul A Carlson in lieu of the power control circuit disclosed therein. The system disclosed herein may advantageously incorporate the combination of the keying circuit and keyable control circuit disclosed in copending U.S. application Ser. No. 301,438 entitled INDUCTION-KEYED CONTROL CIRCUIT WITH KEYING NETWORK HAVING VARIABLE RESONANT FREQUENCY filed on Oct. 27, 1972 in the name of Carl E. Atkins a continuation of application Ser. No. 145,308 filed on May 20, 1971 and now abandoned. Also, the system disclosed herein may advantageously incorporate a warning circuit of the type disclosed in U.S. Pat. No. 3,803,515 issued on Apr. 9, 1974 upon copending U.S. application Ser. No. 255,155 entitled ELECTRONIC TIMING CIRCUITS filed on May 19, 1972 in the name of Paul A. Carlson.

BACKGROUND OF THE INVENTION

The present invention relates to a power control circuit which, for example, may advantageously be employed in a system for controlling access to the interior of a vehicle and subsequent operation of the drive train of said vehicle. Such a system is operative upon unlocking at least the door on the driver's side of the vehicle to enable the authorized person entering the vehicle to start the engine within a predetermined period of time by stepping on the brake pedal, thereby closing the brake light switch associated therewith to energize a portion of the power control circuit, and consequently enabling actuation of the ignition switch. This functioning is carried out by means of the subject power control circuit, which is interconnected with said ignition switch, said brake light switch, and the output of said keyable control circuit. This power control circuit comprises a timing circuit and an enabling circuit. Because the timing circuit is normally energized, it is designed to dissipate a minimum of power in its quiescent or standby state by employing a complementary symmetry/metal oxide semiconductor (COS/MOS) device.

SUMMARY OF THE INVENTION

The present invention is embodied in and carried out by a power control circuit operative to receive a control signal from a keyable control circuit, and in response thereto, to generate a signal to enable the closing of a power circuit within a predetermined period of time by application of an energizing signal. When the power circuit is closed by actuation of a switch or like means, a disabling signal is applied to said power control circuit to prevent further generation of said enabling signal until said switch is de-actuated. Optionally, the power circuit may also provide an actuating signal to a warning circuit which serves to indicate that the aforementioned predetermined period of time is being measured by the timing circuit.

BRIEF DESCRIPTION OF THE DRAWING

The present invention may be better understood by reading the written description thereof with reference to the accompanying drawing, which is a partially schematic, partially block diagram of a system embodying the present invention.

DESCRIPTION OF THE PREFERRED EMBODIMENT

Referring now to the drawing, the door lock and power control system advantageously incorporates the combination of a keying circuit 10 and an associated keyable control circuit 20 of the types disclosed in the cross-referenced applications. As long as keying circuit 10 is held in a predetermined spatial relationship with keyable circuit 20, the latter generates a control signal which is fed to at least one door-unlocking solenoid SOL1. This control signal is also fed to timing circuit 40, which is normally powered by the application of line voltage B+ (nominally) 12 volts) to terminal T1, with terminal T2 being grounded. Thus, zener diode D1 is normally driven past its breakdown point, and in combination with resistance R1 forms a voltage regulator. The substantially constant voltage (about +11 volts) derived at the cathode of D1 is applied through diode D2 to filter capacitance C1. The voltage thus derived at the junction of C1 and D2 is applied to pins 1 and 16 of the COS/MOS circuit which includes inverters A, B and C. The same regulated, filtered voltage is applied through timing resistances R2, which is paralleled by normally-open switch SW1, and R3 to capacitance C2, which is normally charged. A voltage divider formed by series-connected resistances R4 and R5 is coupled to the output of keyable control circuit 20 to receive the momentary control signal therefrom, and to apply the reduced positive voltage developed at the junction of R4 and R5 to input pin 3 of inverter A and input pin 5 of inverter B. In response to this positive input pulse to both inverters A and B, negative-going pulses of like duration are produced at output pin 2 of inverter A and output pin 4 of inverter B. As a result of the latter negative-going pulse, the normally-charged capacitance C2 discharges, thus producing a negative-going pulse at the input pin of inverter C. Consequently, a positive-going pulse will appear at the output pin 6 of inverter C to back bias diode D5. So long as diode D5 is back biased, the normally-closed shunt path through D5, output pin 6 of inverter C and grounded pin 8 of the COS/MOS device will be opened. However, since the output pin 2 of inverter A goes low when output pin 6 of inverter C goes high, and since pin 2 will remain low as long as the input pin 3 is high, the junction of R6 and R7 will remain shunted until the positive input is removed from input pin 3 of inverter A. Resistance R6 serves to limit the magnitude of current flow from the hot terminal T1 through D5 and/or D3 and the COS/MOS device to ground whenever either of the aforementioned shunt paths is closed.

When the control signal generated by keyable control circuit 20 is terminated upon withdrawal of keying circuit 10, input pin 3 of inverter A goes low, thereby causing output pin 2 of inverter A to go high. Thus, the shunt path through diode D3 and pins 2 and 8 of the COS/MOS device is opened. At this point in time, the output of the timing circuit 40 goes from approximately ground potential to a high positive voltage. This timing circuit output is derived at the junction of the anodes of diodes D3 and D5 and resistance R6. Since the termination of the positive input to pin 5 of inverter B also occurred simultaneously with the termination of the positive input pulse to pin 3 of inverter A, output pin 4 of inverter B goes positive simultaneously with output pin 2 of inverter A. Thus, the discharge path for capacitance C2 through diode D4 and pins 4 and 8 of the COS/MOS device is opened, and the timing function is begun by the recharging of C2 by current flowing through timing resistances R2 and R3. When the voltage on capacitance C2 exceeds a predetermined value, the output at pin 6 of inverter C will again go low, thereby reclosing the normally-closed shunt path through diode D5 and pins 6 and 8 of the COS/MOS device, thereby terminating the enabling signal fed to enabling circuit 50. The duration of the enabling signal may be shortened by closing switch SW1, thereby shunting resistance R2 and enabling more rapid charging of capacitance C2.

The positive enabling signal generated by timing circuit 40 is applied through resistance R7 to the base-emitter junction of transistor Q2, thereby causing Q2 to become conductive. However, since there is no power applied to the circuit controlled by transistor Q2, no current will flow across the collector-emitter junction thereof until brake light switch SW2 is actuated. Upon actuation of SW2, energizing current flows through the winding of relay RE1, thereby closing an energizing current path through SW2 and the winding of solenoid SOL3. The actuation of SOL3 enables the multi-position ignition switch SW3 to be actuated, i.e., turned from the OFF position to the ON position. Ignition switch SW3 may be manually actuable with or without the prior insertion of a key. If no key is required, the LOCK position may be eliminated from ignition switch SW3. Upon actuation of ignition switch SW3, a positive voltage is provided to the enabling circuit 50 through resistance R9 to the base of transistor Q1. Thus, Q1 is rendered conductive, and the enabling signal generated by timing circuit 40 is shunted through the collectoremitter terminals of Q1 from the input terminals of Q2. Thus, Q2 becomes non-conductive and energizing current no longer flows through the winding of relay RE1. As a consequence, the energizing current path for the winding of solenoid SOL3 is opened, thereby de-energizing SOL3. However, once the ignition switch SW3 has been removed from the OFF position, de-energization of SOL3 is ineffective to prevent SW3 from being actuated to another position, such as START, ACCESSORY, OFF and LOCK. However, once the ignition switch SW3 is returned to either the OFF or LOCK position, the spring-loaded solenoid SOL3 will again prevent further actuation of SW3 until SOL3 is energized. With transistor Q1 maintained normally conductive when ignition switch SW3 is ON, the actuation of brake light switch SW2 during the normal operation of the associated vehicle will not cause energization of either relay RE1 or solenoid SOL3.

If it is desired to place the vehicle in the custody of parking lot attendant, then either the keying circuit 10 must be placed in the possession of such an attendant or the system must be temporarily altered in such a manner as to enable the attendant to enter and operate the vehicle without the keying circuit. Since the keying circuit 10 may be incorporated in an article on the operator's person such as a ring or a watchband, it would be inconvenient to leave such an article in the hands of an attendant. Therefore, the present system incorporates a mode switch SW4 to enable the owner to make the aforementioned alteration in the system. In the normal setting of the double-pole, double-throw switch SW4 shown in the drawing, the locking solenoid SOL2 may be energized by actuation of manually-operable switch SW5 or by a signal from the door-switch control locking circuit 70. Also, the collector of transistor Q1 is connected through resistance R8 through a floating terminal. If switch SW4 is actuated so that its armatures close with the right pair of contacts instead of the left pair, locking solenoid SOL2 is disconnected from both SW5 and locking circuit 70. Also, the collector of transistor Q1 and the base of transistor Q2 are both connected through resistance R8 to the low side of brake light switch SW2. Thus, if the operator leaves the vehicle in the hands of an attendant with SW4 in this position, the vehicle door or doors will not be automatically locked when the operator opens his door, exits, and subsequently closes his door, which would be the normal operation performed by locking circuit 70 with the mode switch SW4 in its normal position. Thus, the attendant may freely enter the vehicle without need for the keying circuit 10. If it is necessary for the attendant to move the vehicle while it is in his custody, he may start the vehicle's engine by stepping on the brake pedal, thereby actuating brake light switch SW2, which will apply both an input signal through SW4 and R8 to the base of Q2, and power to the high sides of the windings of relay RE1 and solenoid SOL3. Since Q1 is nonconductive with ignition switch SW3 in the LOCK or OFF position, it will not operate to shunt the input to the base of Q2. Thus, both RE1 and SOL3 will be energized, thereby enabling actuation of the ignition switch SW3 and the starter circuit connected thereto (not shown). It should be noted that the use of the brake light switch SW2 to control the application of power to enabling circuit 50 affords the advantages of minimizing standby power dissipation, while introducing into the start-up sequence a step which, in all likelihood, would not be contemplated by an unauthorized person who may have entered the vehicle after causing the generation of a control signal by keyable control circuit 20 with a stolen keying circuit 10.

In the preferred embodiment of the present invention which has been described above and shown in the accompanying drawing, the values and/or characteristics of the various components are as follows:

| Resistances | Capacitances |
|---|---|
| R1 - 1K ohms | C1 - 16 microfarads |
| R2 - 3.6K ohms | C2 - 10 microfarads |
| R3 - 1M ohms | |
| R4 - 10K ohms | |
| R5 - 33K ohms | Transistors |
| R6 - 10K ohms | |
| R7 - 10K ohms | Q1 - 2N5132 |
| R8 - 4.7K ohms | Q2 - 2N3566 |
| R9 - 10K ohms | |
| | Diodes |
| COS/MOS Device | |
| | D1 - 1N5241 |
| CD4009AE | D2 - 1N4148 |
| | D3 - 1N4148 |
| | D4 - 1N4148 |

-Continued

| Resistances | Capacitances |
| --- | --- |
| Relay | D5 - 1N4148 |
|  | D6 - 1N4148 |
| RE1 - Line Electric | D7 - 1N5059 |
| MWVD-12 VDC | D8 - 1N5059 |
|  | D9 - 1N5059 |

The advantages of the present invention, as well as certain changes and modifications of the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

What is claimed is:

1. A power control circuit comprising:
   1. timing circuit means operative to receive an input signal and to generate an enabling signal for a predetermined period of time from the termination of said input signal; and
   2. enabling circuit means operative to receive said enabling signal and an energizing signal, and operative in response to the coincidence of said enabling and energizing signals to generate an output signal.

2. The power control circuit according to claim 1 wherein said timing circuit means comprises:
   1. voltage regulation means;
   2. voltage divider means;
   3. charging circuit means including a normally-charged timing capacitance; and
   4. semiconductor means operative to discharge said timing capacitance upon initiation of said input signal, and to generate said enabling signal from the termination of said input signal until said timing capacitance is recharged to a predetermined level.

3. The power control circuit according to claim 2 wherein said semiconductor means comprises first, second and third inverter means having first, second and third diodes, respectively, connected to the output pins of the respective inverter means, said first and second inverter means having their input pins connected in parallel to said voltage divider means, the high side of said timing capacitance being connected to the anode of said second diode and the input pin of said third inverter means, with the anodes of said first and third diodes being connected to the output of said timing circuit means.

4. The power control circuit according to claim 1 wherein said enabling circuit means is operative to receive a disabling signal, in response to which said enabling circuit means is disabled from generating said output signal.

5. The power control circuit according to claim 1 wherein said enabling circuit means comprises:
   1. a first normally non-conductive transistor;
   2. a second, normally non-conductive transistor having its input terminals connected across the output terminals of said first transistor;
   3. a relay having its winding connected at one terminal to the output terminal of said second transistor, the other terminal of said relay being operative to receive said energizing signal; and
   4. a normally de-energized solenoid having its winding connected at one terminal to a normally open contact of said relay, the other terminal of said solenoid winding being operative to receive said energizing signal.

* * * * *